US006552814B2

(12) United States Patent
Okimoto et al.

(10) Patent No.: US 6,552,814 B2
(45) Date of Patent: Apr. 22, 2003

(54) PRINT SYSTEM FOR EXECUTING PRINTING OPERATIONS BASED ON MACROS SELECTIVELY DESIGNATED ON DOCUMENT SET BASIS

(75) Inventors: Satoshi Okimoto, Komaki (JP); Yoshie Teramura, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/185,614

(22) Filed: Nov. 4, 1998

(65) Prior Publication Data

US 2002/0101599 A1 Aug. 1, 2002

(30) Foreign Application Priority Data

Nov. 5, 1997 (JP) .............................................. 9-303084

(51) Int. Cl.⁷ .............................................. G06F 13/00
(52) U.S. Cl. ...................... 358/1.13; 358/1.18; 358/450; 358/530
(58) Field of Search .............................. 358/1.12, 1.13, 358/1.14, 1.15, 1.16, 1.17, 1.18, 296, 401, 450, 452, 453, 501, 530, 537; 382/135, 139, 175, 306; 399/145, 182, 366, 368; 707/515, 517, 508

(56) References Cited

U.S. PATENT DOCUMENTS

| | | | | | |
|---|---|---|---|---|---|
| 5,091,868 A | * | 2/1992 | Pickens et al. | ............ | 358/1.18 |
| 5,465,160 A | * | 11/1995 | Kamo et al. | ................ | 358/401 |
| 5,751,924 A | * | 5/1998 | Hamada et al. | ............ | 358/1.16 |
| 5,963,968 A | * | 10/1999 | Warmus et al. | ............. | 707/517 |
| 6,078,403 A | * | 6/2000 | Palmer | ...................... | 358/1.18 |

FOREIGN PATENT DOCUMENTS

JP          8-292684        11/1996

* cited by examiner

*Primary Examiner*—Mark Wallerson
(74) *Attorney, Agent, or Firm*—Oliff & Berridge, PLC

(57) ABSTRACT

A print system enables a user to set a different macro for each of a plurality of document sets in a simple method. A macro setting window 44a includes a macro display region 21, a macro setting region 26, an image region 25, a REGISTER button 22, a NEW button 23, and a DELETE button 24. The macro display region 21 displays macros selectable for the user and corresponding identification numbers. The macro setting region 26 includes a first input box 27 and a second input box 28. The user inputs an identification number of a desired macro in the first input box 28. Then, the user inputs in a corresponding second input box a numeral for designate a document set to which the selected macro is applied.

15 Claims, 10 Drawing Sheets

ID1 = "LOGO"
ID2 = "Confidential"

ST1    FIRST DOCUMENT SET ORIGINAL IMAGE (FOR USER)

ST2    SECOND TO FIFTH DOCUMENT SETS
ORIGINAL IMAGE + ID2 (FOR OFFICE)

ST3    SIXTH TO TENTH DOCUMENT SETS
ORIGINAL IMAGE + ID1 + ID2 (FOR CLIENT)

ID1 = "LOGO"
ID2 = "Confidential"

ST1

FIRST DOCUMENT SET ORIGINAL IMAGE (FOR USER)

ST2

SECOND TO FIFTH DOCUMENT SETS
ORIGINAL IMAGE + ID2 (FOR OFFICE)

ST3

SIXTH TO TENTH DOCUMENT SETS
ORIGINAL IMAGE + ID1 + ID2 (FOR CLIENT)

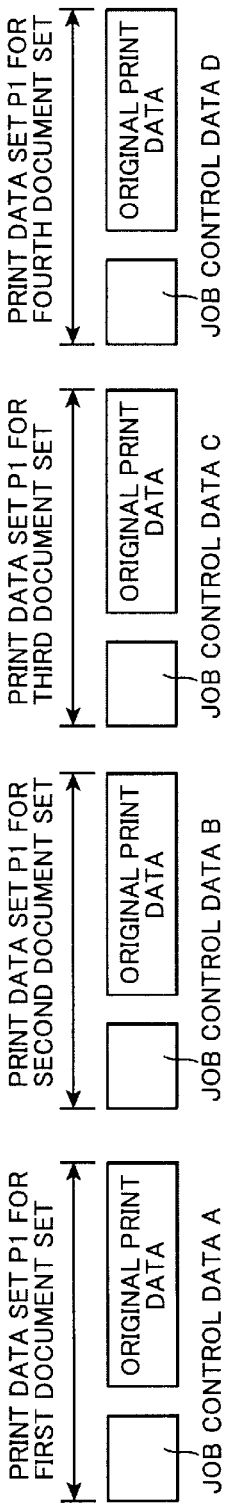
FIG.8(a) FIRST METHOD
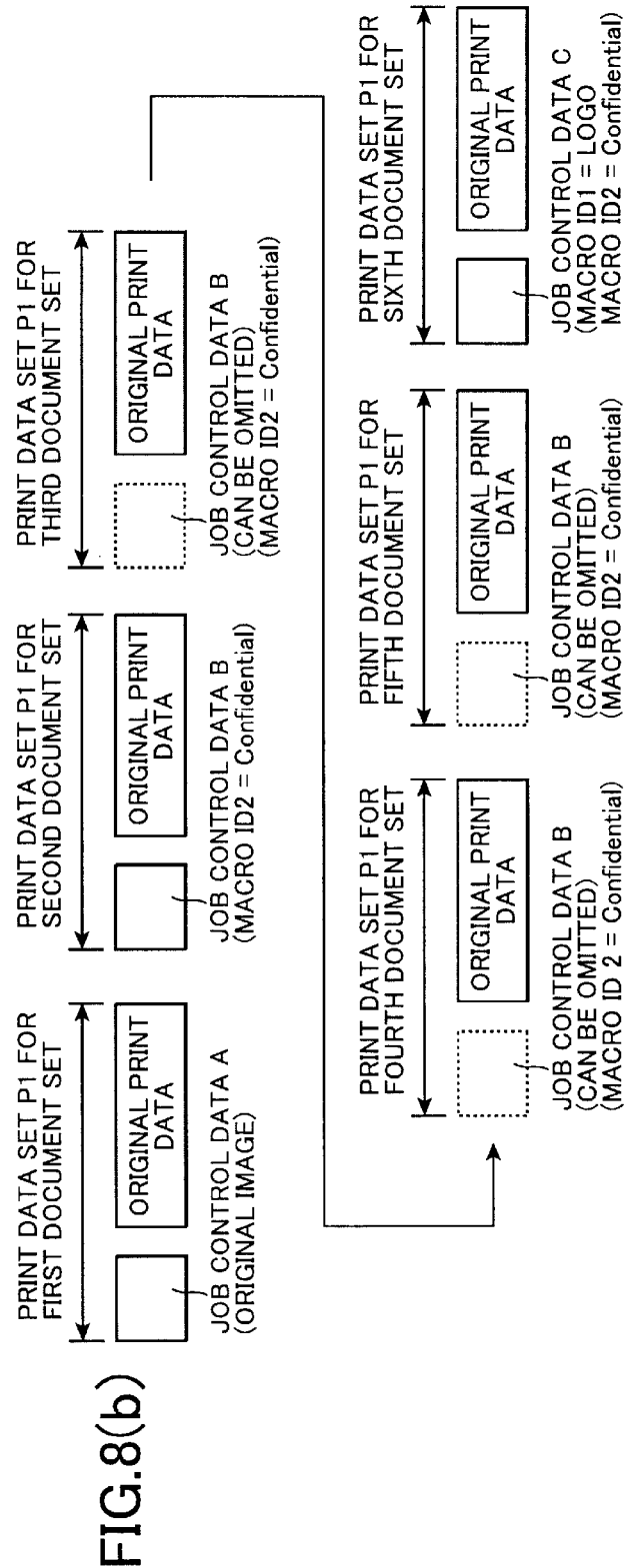
FIG.8(b) FIRST METHOD (FOR THE EXAMPLE SHOWN IN FIG.3)

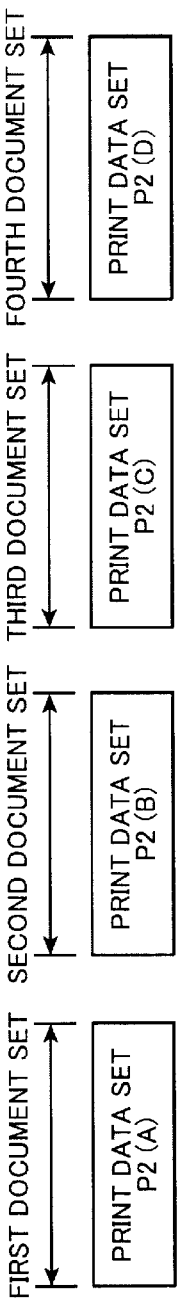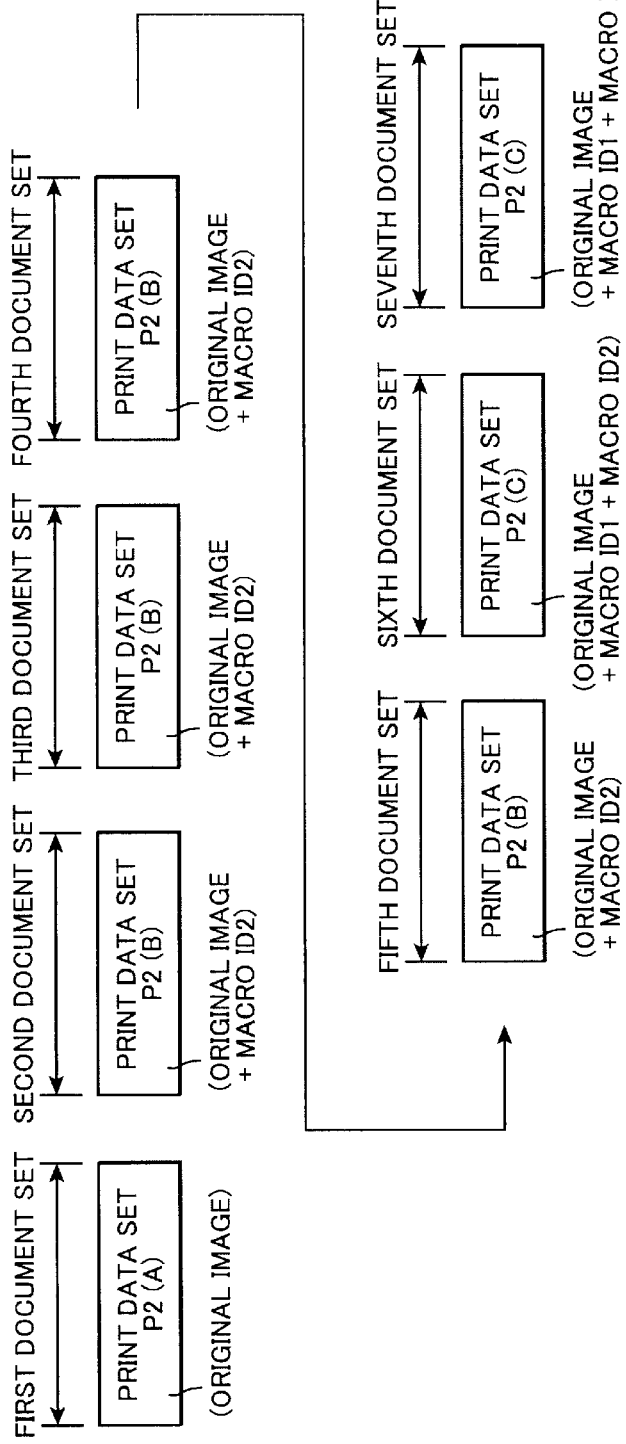

FIG.10(a) THIRD METHOD
PRINT DATA SET P3 
FIG.10(b) JOB CONTROL DATA FOR THE EXAMPLE SHOWN IN FIG.3
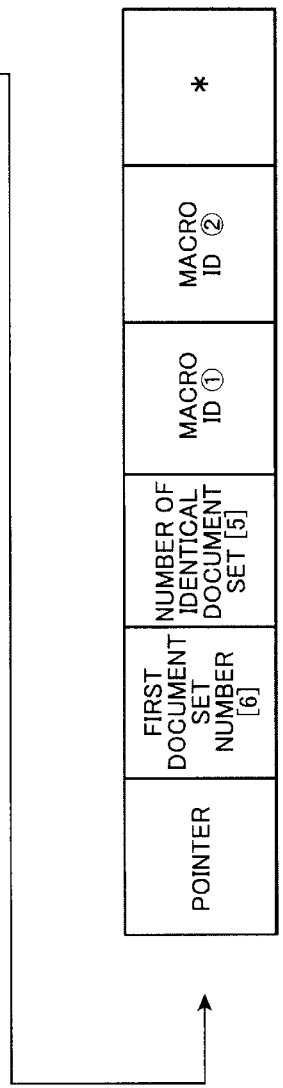

PRINT SYSTEM FOR EXECUTING PRINTING OPERATIONS BASED ON MACROS SELECTIVELY DESIGNATED ON DOCUMENT SET BASIS

BACKGROUND OF THE INVENTION

1. Field of the Invention

The present invention relates to a print system for forming images based on image data to provide a plurality of document sets, each printed out by a different printing process based on a different macro. The present invention also relates to an image forming device including the print system and a method of operating the print system.

2. Description of Related Art

Japanese Patent-Application Publication (Kokai) No. HEI-8-292684 discloses a printer for printing an image on a recording medium to produce a document. The printer executes printing operations in accordance with a mode set by a user. For example, depending on the mode, the printer forms an image enlarged or reduced in size or an image with a certain toner density, or discharges the document onto a designated one of several discharge trays.

The printer can also be set to a mode for printing out more than one document set at a time. For example, the user can control the printer to printout identical copies of a single document. Identical copies of a single document will be referred to as document copies hereinafter. In this case, the user can designate the same mode for all document sets, whereupon the printer will print a designated number of document copies. Alternatively, the user can control the printer to print out modifications of a document by designating a certain macro. An example of a macro for producing a document modification is a macro for forming an overlay image "Confidential" diagonally across the document. Still further, the user can designate some document sets to be document copies and others to be macro induced document modifications. That is, selected document sets are printed out in accordance with the selected mode to provide document modifications, and other will be printed out normally to provide document copies.

In other words, when a plurality of document sets are printed out, some of the document sets are printed out using normal printing processes, and the rest of the documents sets are printed out in accordance with the selected mode. For example, a first document set may be printed out using normal printing processes, and the others may be printed out in enlargement printing processes or reduced printing processes. Also, a first document set may be formed with an image in a normal toner density, and the others may be formed with an image in a greater toner density. Further, a first document set may be discharged onto one discharge tray, and others may be discharged onto a different discharge tray.

However, the above-described printer cannot be set to a different mode for each one of a plurality of document sets. Also, operations for forming an overlay image over an original image are time consuming and complicated. For example, if a user wishes to obtain a document in the style shown in FIG. 2(b), wherein an overlay image "Confidential" is formed over an original image, first, the printer receives original print data from an external device, such as a computer, and forms the original image based on the original print data. Next, the printer receives form-overlay data from the computer, and then forms the overlay image "Confidential" based on the form-overlay data over the original image. In this way, the printer needs to repeat printing operations twice.

SUMMARY OF THE INVENTION

It is an objective of the present invention to provide a print system in which a user can set different printing processes for each one of a plurality of document sets in a simple manner.

It is an another objective of the present invention to provide an image forming device and a method for operating the print system.

In order to achieve the above and other objectives, there is provided a print system including a data processing unit that generates print data, setting means for individually setting printing processes on a document set basis, and an image forming unit that executes printing operations based on the print data. The image forming unit executes the printing operations to produce a plurality of document sets based on identical print data generated by the data processing unit and based further on the printing processes individually set to each of the plurality of document sets by the setting means.

There is also provided a print system including a data processing unit that generates print data, a memory that stores a plurality of macros, macro designating means for selectively designating one or ones of the macros on a document set basis, and an image forming unit that executes printing operations based on the print data. The image forming unit executes the printing operations to produce a plurality of print sets based on identical print data generated by the data processing unit and based further on the one or ones of macros selectively designated to each of the plurality of document sets by the macro designating means.

Also, there is provided a print system including a first print data generating unit that generates original print data, a macro generating unit that generates a macro, a memory that stores a plurality of macros each generated by the macro generating unit, macro designating means for selectively designating one or ones of the macros on a document set basis, a second print data generating unit that generates print data based on the original print data and based further on the one or ones of the macros selectively designated by the macro designating means, and an image forming unit that executes printing operations based on the print data generated by the second print data generating unit to produce a plurality of document sets.

Further, there is provided a print system including a computer and an image forming unit that is communicable with the computer. The computer includes a macro generating unit that generates at least one macro, a first print data generating unit that generates original print data, macro designating means for selectively designating the at least one macro on a document set basis, and a communication unit that transmits the at least one macro and the original print data. The image forming device includes a first memory that stores the at least one macro, a second memory that stores the original print data, and an image forming unit that executes printing operations based on the original print data. The image forming unit executes the printing operations to produce a plurality of document sets based on identical original print data generated by the first print data generating unit and based further on the at least one macro selectively designated to each of the plurality of document sets by the macro designating means.

Still further, there is provided an image forming device including print process setting means for selectively setting printing processes on a document set basis and an image forming unit that executes printing operations to produce a plurality of document sets based on the print processes selectively set by the print process setting means to each of the plurality of document sets.

There is also provided an image forming device communicable with an external device. The image forming device includes macro generating means for generating a macro, a memory that stores at least one macro generated by the macro generating means, macro designating means for selectively designating the at least one macro on a document set basis, and an image forming unit that executes printing operations based on print data received from an external device. The image forming unit executes the printing operations to produce a plurality of document sets based on identical print data received from the external device and based further on the at least one macro selectively designated by the macro designating means to each of the plurality of document sets.

Further, there is provided a method of forming an image on a recording medium based on print data to produce a plurality of document sets. The method includes the steps of a) generating print process data as a macro, b) transmitting the macro from a computer to an image forming device, c) storing the macro transmitted from the computer into a memory, d) generating print data, e) selectively designating one macro or a plurality of macros on a document set basis, and f) executing printing operations to produce a plurality of document sets based on identical print data generated in the step e) and based further on the macro or the plurality of macros selectively designated for each of the plurality of document sets.

BRIEF DESCRIPTION OF THE DRAWINGS

The particular features and advantages of the invention as well as other objects will become more apparent from the following description taken in connection with the accompanying drawings, in which:

FIG. 8(a) is an explanatory view showing a first form of print data;

FIG. 8(b) is an explanatory view showing an example of the first form of print data representing the conditions shown in FIG. 3a;

FIG. 9(a) is an explanatory view showing a second form of print data;

FIG. 9(b) is an explanatory view showing an example of the second form of print data representing the conditions shown in FIG. 3;

FIG. 10(a) is an explanatory view showing a third form of print data; and

FIG. 10(b) is an explanatory view showing an example of a job control command included in print data in the third form representing the conditions shown in FIG. 3.

DETAILED DESCRIPTION OF THE PREFERRED EMBODIMENTS

A print system according to a preferred embodiment of the present invention will be described while referring to the accompanying drawings.

Figure 1:
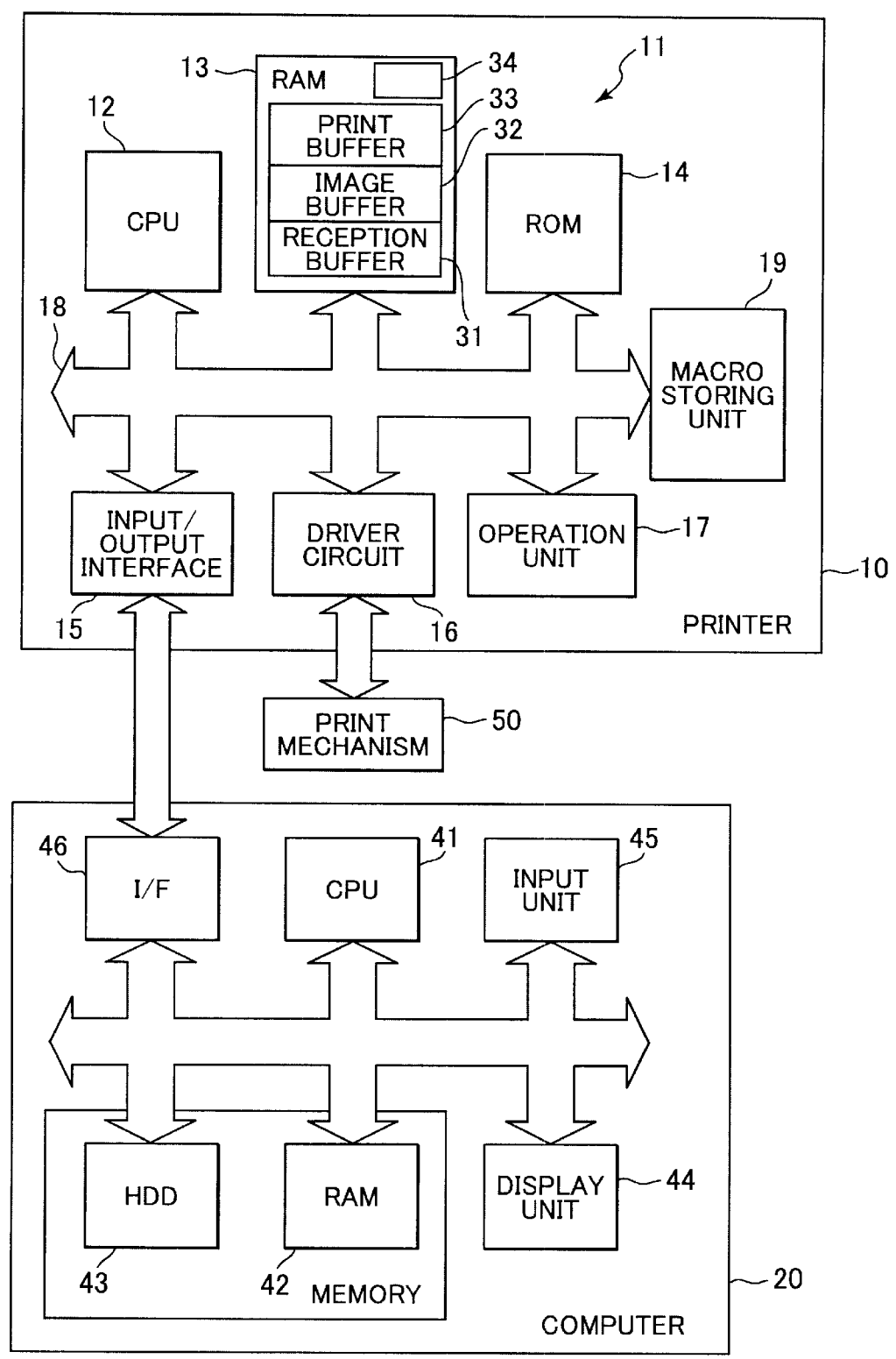
FIG. 1 is a block diagram showing configuration of a print system according to an embodiment of the present invention.

First, a configuration of a print system 1 will be described while referring to FIG. 1. As shown in FIG. 1, the print system 1 includes a printer 10 and a computer 20 communicable with the printer 10. The printer 10 includes a control device 11 which has a central processing unit (CPU) 12, a read only memory (ROM) 14, a random access memory (RAM) 13, a macro storage unit 19, an input/output interface 15, an operation unit 17, and a driver circuit 16, all connected via a bus 18.

The CPU 12 executes overall control of the control device 11. The ROM 14 stores a main control program. The RAM 13 includes a reception buffer 31, an image buffer 32, and a print buffer 33. Although not shown in the drawings, the RAM 13 further includes a page counter and a document counter. The reception buffer 31 stores various data transmitted from the computer 20. The image buffer 32 stores print data. The print buffer 33 processes and stores print data. The macro storage unit 19 stores macros (to be described later). The macro storage unit 19 is preferably a flash memory, that is, an electrically erasable programmable read only memory (EEPROM) that can erase its contents at a time, or a non-voluntary storage unit, such as a versatile EEPROM. However, the macro storage unit 19 can be included in the RAM 13. The printer 10 is connected to the computer 20 via the input/output interface 15. A user operates the operation unit 17 to input various commands. The printer 10 also includes a print mechanism 50 connected to and controlled by the driver circuit 16.

The computer 20 includes a CPU 41, a ROM (not shown), a hard disk driver (HDD) 43, a RAM 42, an input unit 45, a display 44, and an input/output interface (I/F) 46. The CPU 41 executes overall control of the computer 20. The ROM stores control programs for controlling basic hardware of the computer 20. The HDD 43 stores applications, such as word processor and printer device applications, that is, programs for processing print data. The HDD 43 also stores macro functions. The RAM 42 temporarily stores the programs read from the HDD 43 when the programs are executed. The input unit 45 includes a keyboard and a mouse. The user operates the input unit 45 to input a printing command and other commands. The display 44 includes a cathode ray tube (CRT) and a liquid crystal display. The computer 20 communicates with the printer 10 via the input/output interface 46.

The system described above enables a user to print out a document based on original print data by selecting a desired macro. Specifically, the printer 10 executes printing operations according to selected printing processes for forming an original image based on original print data. Depending on the macro, the printer 10 may print the original image enlarged, reduced, rotated, changed in color, or overlaid with an another image. These printing processes are executed based on sets of data series pre-stored as macros in the macro storage unit 19. The user can control the printer 10 to execute desired printing processes simply by selecting the corresponding macro without inputting the series of data.

In other words, a macro is a pre-stored series of data necessary for executing operation processes, and can be executed as desired. Macros specially designed for printing operations provide various kinds of printing effects. These macros include an overlay macro for forming an overlay image on an original image and a command macro for executing control programs for, for example, enlargement printing or reducing printing.

Also, when the user wishes to obtain a plurality of document sets, the present invention enables the user to set a different macro or a combination of different macros for each document set so as to obtain different printing results for each of different document sets. It should be noted that usually, macros are generated by a user by using the printer driver of the computer 20. Each generated macro is assigned with an identification number and stored in the storage unit 19 of the printer 10. Also, the macro is registered in the HDD 43 of the computer 20.

Figure 2A:
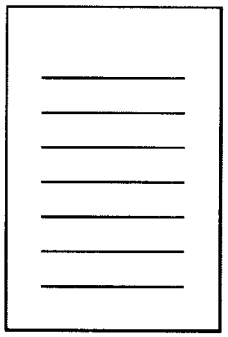
FIG. 2(a) is an explanatory diagram showing an example of a document set printed by a conventional print system and the print system of FIG. 1.
Figure 2B:
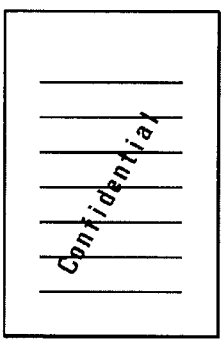
FIG. 2(b) is an explanatory diagram showing another example of a document set printed by the conventional print system and the print system of FIG. 1.
Figure 2C:
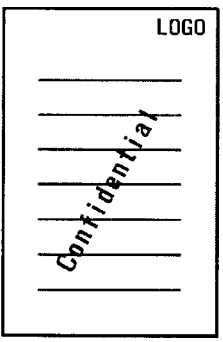
FIG. 2(c) is an explanatory diagram showing another example of a document set printed by the conventional print system and the print system of FIG. 1.

Here, an example will be described for when a user wishes to obtain three document sets, specifically, a document copy in a first style ST1 shown in FIG. 2(a), a first document modification in a second style ST2 shown in FIG. 2(b), and a second document modification in a third style ST3 shown in FIG. 2(c). The copy printed in the first style ST1 includes only an original image based on original print data. The user may use the copy for himself/herself. However, the first modified copy printed in the second style ST2 also includes, over the original image, a first overlay image "Confidential" based on a first form-overlay data. The user may hand out the first modified copy to workers in his/her office. Further, the second modified copy printed in the third style ST3 further includes, that is, in addition to the first overlay image "Confidential", a second overlay image "LOGO" formed over the original image. The second overlay image "LOGO" is formed based on second form-overlay data. The user may give the second modified copy printed in the third style ST3 to a client.

The above-described first form-overlay data and second form-overlay data are previously generated, stored as first and second macros in the macro storage unit 19 of the printer 10, and assigned with identification numbers ID2, ID1, respectively. In order to obtain the document sets shown in FIGS. 2(a) to 2(c), the user can selectively set the first and second macros for each document set, so that the printer 10 forms the first and second overlay images. Specifically, the copy in the first style ST1 is printed out while executing no macro. The first modified copy in the second style ST2 is printed out while executing the first macro, and the second modified copy in the third style ST3 is printed out while executing a combination of the first and the second macros.

Next, processes for executing macros will be described. A macro is executed when the user sets a macro for original print data and inputs a print command for printing operations. When the print command is input, the original print data and a macro command, which is data indicating the selected macro, are transmitted from the computer 20 to the printer 10 and stored in the reception buffer 31 of the printer 10. Then, the CPU 12 generates original image data based on the original print data according to the programs stored in the ROM 14. Then, the original image data is stored in the image buffer 32. Next, the CPU 12 detects the identification number in the macro command for the selected macro. Then, the CPU 12 retrieves the selected macro from the macro storage unit 19 and executes the macro.

If the selected macro is form-overlay data for forming an overlay image, the CPU 12 generates overlay image data from the form-overlay data, and stores the overlay image data into the image buffer 32. Next, the original image data is first stored into the print buffer 33, and then, the overlay image data is stored in the print buffer 33 to be combined with the original image data. Then, the printer 10 forms an image on a recording medium based on the resultant image data. In this way, the original image and the from overlay image are formed. It should be noted that the above-described processes are preferably executed when the original print data and the form-overlay data are formed in a high-level language, such as procedure definition language (PDL).

It should be noted that although, in the above-described example, the original image data and the overlay image data are stored as dot pattern image data in the image buffer 32, interim data can be stored in the image buffer 32 instead. The interim data can be, for example, compressed data or command data. The compressed data is data generated by compressing the original image data and the overlay image data with respect to each dot line. The command data includes a pointer indicating a storing area of the ROM 14 or the RAM 13 where the original image data and the overlay image data are stored. When the interim data, and not the original image data and the overlay image data, is stored in the image buffer 32, the selected macro is executed during storage of the original image data into the print buffer 33. For example, the original image data may be combined with the overlay image data, or spaces between adjacent dots of the original image macro may be subtracted for reducing printing.

Next, a method of setting a different macro for each of a plurality of document sets will be described while referring to FIG. 3. It should be noted that various types of macros are provided. Also, these macros can be combined in a variety of combinations. However, in this example, a method of setting only the first macro ("Confidential") and the second macro ("LOGO") described above will be described.

The user sets macros on the display 44 of the computer 20 in the following method. As shown in FIG. 3, the display 44 of the computer 20 displays a macro setting window 44a. The macro setting window 44a includes a macro display region 21, a macro setting region 26, an image region 25, a REGISTER button 22, a NEW button 23, and a DELETE button 24. The macro display region 21 displays macros selectable for the user and corresponding identification numbers. In this example, the macro display region 21 displays the first macro "Confidential" with its identification number ID2 and the second macro "LOGO" with its identification number ID1. The image region 25 displays images which will be obtained by executing the first and second macros. The macro setting region 26 includes a first input box 27 and a second input box 28.

The user inputs an identification number of a desired macro in the first input box 27 for each different type of document set to be printed. Then, the user inputs a numeral in the corresponding second input box 28 to designate a document set to be applied with the selected macro. When the user wishes to obtain a series of two or more identical document sets, the user only needs to input a numeral in the second input box 28 that identifies a first one of the series of identical document sets.

Figure 3:
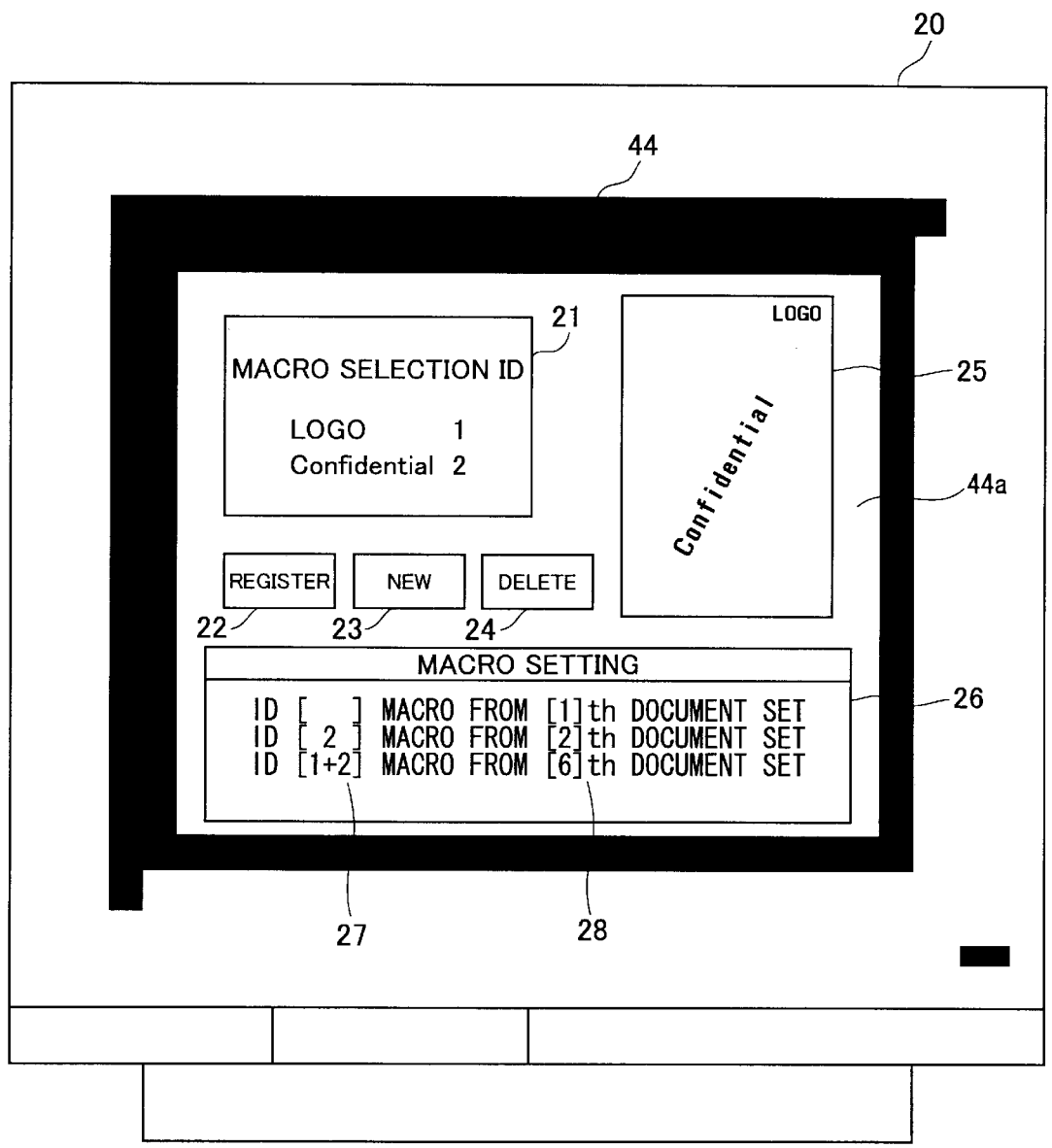
FIG. 3 is a plan view showing a macro setting window of the print system of FIG. 1.

An example will be described for when the user wishes to obtain ten document sets and inputs numerals in the macro setting region 26 as shown in FIG. 3. In this case, ten document sets are divided into first, second, and third groups each includes identical document copies. Specifically, the first group includes a first document set in the first style ST1 shown in FIG. 2(a), the second group includes second to fifth document sets in the second style ST2 shown in FIG. 2(b), and the third group includes sixth to tenth document sets in the third style ST3 shown in FIG. 2(c). As mentioned above, the user needs to input in the second input box 28 a numeral indicating only a first document set of a corresponding group. Because the first input box 27 for the first group is left blank in FIG. 3, the first copy is printed out without the first macro or the second macro. When a plurality of macros are selected at the same time, numerals with a symbol "+" between adjacent numerals are inputted in the first input box 27.

In this way, a different macro can be set for each document set when the user wishes to obtain a plurality of document sets.

Next, processes of generating a new macro will be described while referring to FIGS. 1 and 3. First, the user clicks on the NEW button 23 on the macro setting window 44a, so that the display 44 displays a macro registration window (not shown). Next, the user generates a desired macro in a conventional manner using the printer driver of the computer 20. When the user clicks on the REGISTER button 22, the generated macro is sent to the printer 10 via the input/output interface 15. The macro is temporality stored in the reception buffer 31 of the printer 10. The CPU 12 of the printer 10 detects the macro in the reception buffer 31, and stores the macro into the macro storage unit 19.

When the user wishes to delete a registered macro, the user selects an unneeded macro and clicks on the DELETE button 24.

Figure 7:
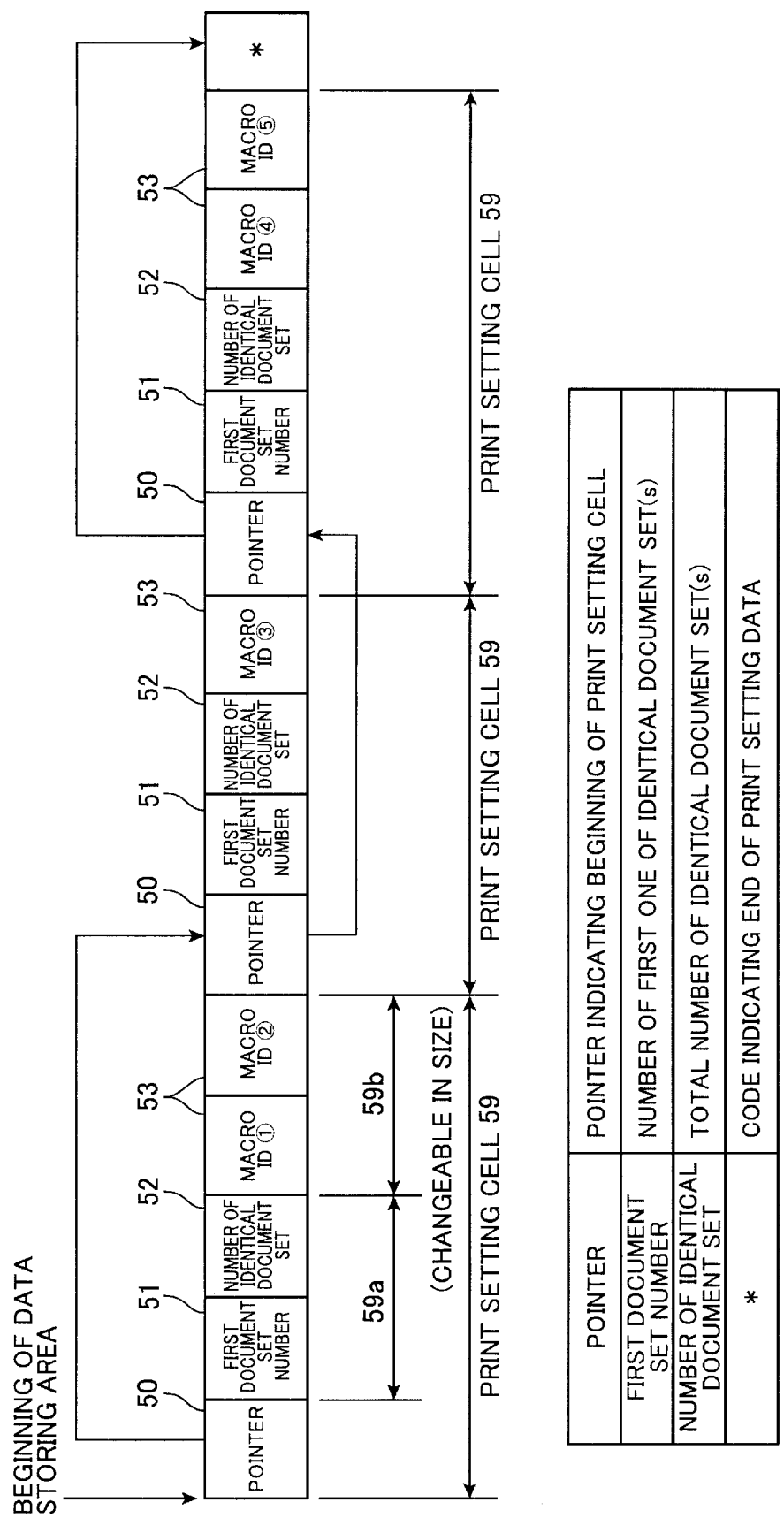
FIG. 7 is an explanatory view showing a form of print setting data.

Next, detailed description of print setting data will be provided while referring to FIG. 7. Print setting data is generated when the user completes setting macros for document sets on the macro setting region 26. At this time, an area of the RAM 42 of the computer 20 is temporality assigned as a print setting area, and the print setting data is temporality stored in the print setting area. The print setting data has a predetermined form. An example of the form is shown in FIG. 7. In this example, the macro setting data includes a plurality of print setting cells 59 for corresponding groups of document sets. Each print setting cell 59 includes a first area 50, a second area 51, a third area 52, and a fourth area 53. The first area 50 indicates a pointer location, that is, an address, of a subsequent print setting cell 59. The second area 51 stores data indicating a first copy of a corresponding group. The third area 52 stores data the indicating total number of document sets included in the group. The fourth area 53 includes data identifying a macro for the group, and is changeable in size. The second and the third areas 51, 52 serve as a document-set number designating area 59a, and the forth area 53 serves as a macro designating area 59b.

It should be noted that, rather than the form shown in FIG. 7, the print setting data can be in a form usable as a job control command (described later) without change in its form. Also, the print setting data can be in a form storable in a storing area 34 of the RAM 3 of the printer 10. (Storing process will be described later).

Next, print data will be described. The print data is data generated by and transmitted from the computer 20 to the printer 10 when the user inputs a print command for executing printing operations. The print data includes the original print data and a job control command. The job control command is generated based on the above-described print setting data stored in the print setting area of the RAM 42. The job control command includes either a macro command indicating a selected macro stored in the macro storage unit 19 or a macro itself.

The print data can be processed and transmitted from the computer 20 to the printer 10 in different forms. Three examples forms will be described next while referring to FIGS. 8 to 10.

First, a first form will be described while referring to FIGS. 8(a) and 8(b). As shown in FIG. 8(a), a separate print data set P1 is generated by the CPU 41 based on the print setting data for each document set to be printed. Each print data set P1 includes a job control command followed by a complete set of the original print data. The job control command can be omitted from a subsequent print data set P1 when two or more identical document sets are to be printed out in row, that is, when a subsequent print data set P1 includes a job control command identical with the job control command of the preceding print data set P1. FIG. 8(b) shows an example of the print data set P1 generated based on settings shown in the macro setting region 26 for the example in FIG. 3.

The first form is preferably used when the printer 10 has insufficient memory capacity to store the print data set P1. For example, when two six-page document sets to be printed out, but the memory of the printer 10 is incapable of storing an entire print data set P1 (i.e., all six page's worth of print data), the two print data sets P1 can be both divided into a first part and a second part, wherein the first part includes the original print data for first and second pages and a corresponding job control command, and the second part includes the original print data for third to sixth pages and also the corresponding job control command, although the job control command can be omitted from the second part. Then, the first part of the first print data set P1 is transmitted, and after the first two pages are printed out, the second part of the first print data set P1 is transmitted. Next, the first part of the second print data set P1, the first two pages are printed out, and the second part of the second print data set P1 are transmitted. In this way, both print data sets P1 are transmitted.

Needless to say, the first form can also be used when the printer 10 includes a memory capable of storing whole print data sets P1. In this case, when a subsequent print data set P1 includes the same job control command and original print data as a preceding print data set P1, the CPU 41 can add data to the job control command of the preceding print data set P1 to indicate that two identical document sets must be printed. Then, the subsequent print data set P1 needs not be transmitted at all. In this way, redundant transmission of identical print data sets can be prevented.

Next, a second form of print data will be described while referring to FIGS. 9(a) and 9(b). With the second form, the computer 20 generates image data based on the original print data and any macros, and transmits the image data to the printer 10. The second form is used when the computer 20 includes an additional storing unit for storing macros, and when the printer 10 does not include a memory, such as, the macro storage unit 19, capable of storing macros,. In the second method, a selected macro is executed in the computer 20 and a plurality of print data sets P2 each for a corresponding document set are generated based on the original print data and the executed macro. Then, the print data sets P2 are sequentially transmitted to the printer 10. Because the macro has been executed in the computer 20, the printer 10 can execute printing operations based on the print data P2 without further processing the print data P2. FIG. 9(b) shows an example of print data P2 for the example shown in the macro setting region 26 in FIG. 3.

Next, a third form of print data will be described while referring to FIGS. 10(a) and 10(b). In the third method, only a single print data set P3 is transmitted. The print data set P3 includes the original print data and, as a job control command, the above-described print setting data. Because only one print data set P3 is transmitted, process for transmitting data can be simplified. The third form can be used when the printer 10 includes sufficient memory capacity to store the original print data. FIG. 10(b) shows a job control command in print data P3 generated for the example shown in macro setting region 26 of FIG. 3. Because the job control command has been already described above with reference to FIG. 7, duplicated explanation of the job control command will be avoided.

Figure 4:
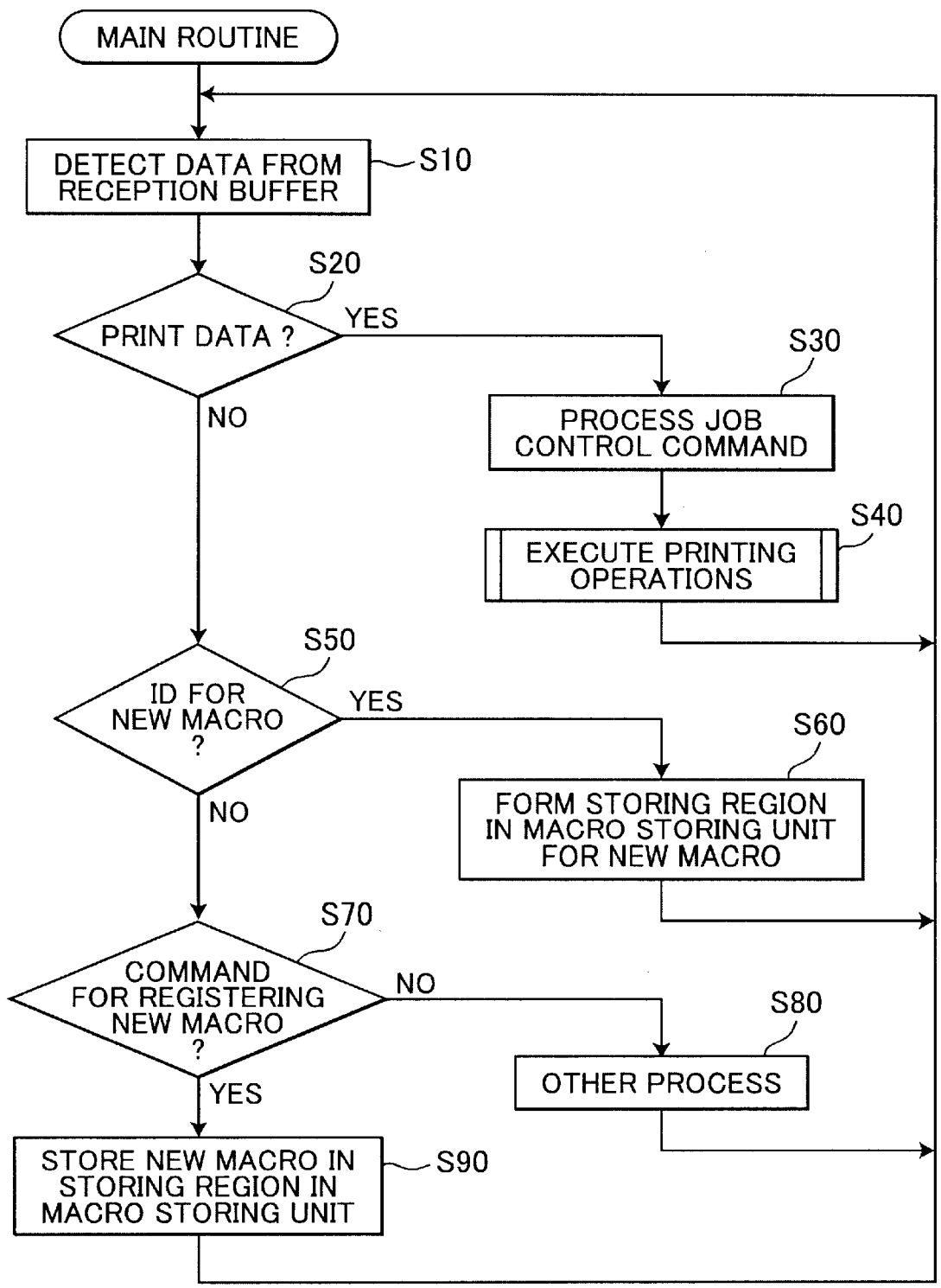
FIG. 4 is a flowchart representing a main routine executed in the print system of FIG. 1.

Next, a main routine executed in the print system 1 will be described while referring to the flowchart shown in FIG. 4. The main routine is executed when data transmitted from the computer 20 is stored in the reception buffer 31 of the printer 10. In this example, print data is transmitted in the above-described third form.

It should be noted that a previously registered macro can be transmitted to the printer 10 with the print data when the user inputs a print command. Alternatively, the macro can be transmitted to the printer 10 and stored in the macro storage unit 19 when first registered by the user and generated.

First, in S10, the CPU of the printer 10 detects the data in the reception buffer 31. Then, it is determined in S20 whether or not the data is a command for starting printing operations. If not (S20:NO), then, it is determined in S50 whether or not the data is macro identification data for a newly generated macro. If so (S50:YES), the program proceeds to S60 wherein a new macro storing region for the new macro is formed in the macro storage unit 19. Then, the program returns to S10.

On the other hand, if S50 results in a negative determination (S50:NO), it is determined in S70 whether or not the data is a command for registering the new macro. If so (S70:YES), this means that the macro storing region for the present new macro has been already formed in the macro storing unit 19 in S60. Then, the program proceeds to S90 wherein the CPU 12 stores the data as a macro in the macro storage unit 19 until a stop command is detected, whereupon the program returns to S10.

If S70 results in a negative determination (S70:NO), then in S80, the CPU 12 executes processes according to the data. The processes may be any processes other than the processes relating to print data or a macro. For example, the CPU 12 may investigate error status of the printer 10 and transmit investigation results to the computer 20. Afterward, the program returns to S10.

If it is determined in S20 that the data stored in the reception buffer 31 is a print command (S20:YES), the CPU 12 processes, in S30, the job control command included in the print data. As described above, the job control command includes data on a total number of document sets and a macro designated for each document set. More specifically, the CPU 12 detects contents of the job control command and stores the contents in a data storing region 34 of the RAM 13. For example, based on the job control command, that is, the macro setting data shown in FIG. 7, the CPU 12 generates a table (not shown) showing a plurality of macro-designating areas each for a corresponding document set. When two or more identical document sets are to be printed out, macro designating areas for second and subsequent ones of the identical document sets will be left blank. The table is used when the printer 10 executes printing operations. After one document set's worth of printing operations are completed, the CPU 12 reads the table and prints out the second document set listed on the table.

Figure 5:
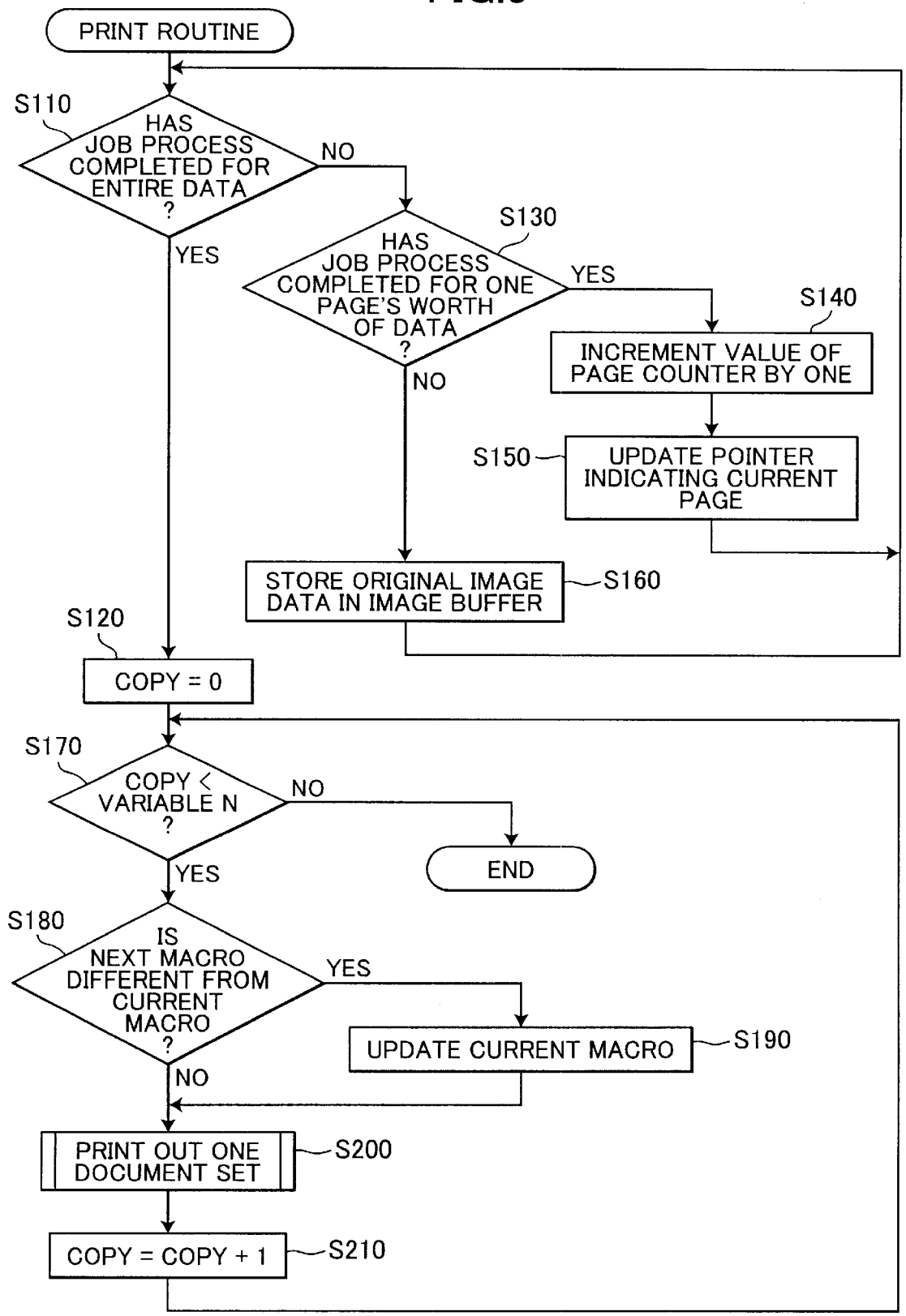
FIG. 5 is a flowchart representing a print routine of the main routine.

After the job control command is processed in S30, a print routine is executed in S40. Detailed description of the print routine will be described next while referring to the flowchart shown in FIG. 5.

First, in S110, it is determined whether or not a job process (described later) has been executed for all pages' worth or print data. If not (S110:NO), then, it is determined in S130 whether or not the job process has been completed for one page's worth of the original print data. If not (S130:NO), the process proceeds to S160 wherein the job process is executed. More specifically, the original print data is retrieved from the reception buffer 31. The original print data may be formed in PDL, for example. Then, the CPU 12 generates original image data based on the original print data by executing calculation processes, and stores the original image data into the image buffer 32. Then, the program returns to S110.

On the other hand, if S130 results in an affirmative determination (S130:YES), then in S140, a counter value of the page counter is incremented by one. Next, in S150, a pointer indicating a current page is updated, and the program proceeds to S110. That is, the job process is executed for the original print data for an entire document.

If it is determined in S110 that the job process has been completed for the original print data (S110:YES), the program proceeds to S120 wherein the counter value of the page counter is initialized to zero. Next, it is determined in S170 whether or not a counter value of the document counter is less than a value set by the user. The set value indicates a total number of document sets to be printed out. If not (S170:NO), the present routine is ended. On the other hand, if so (S170:YES), this means that there is at least one more document set to be printed out. Then, based on the table stored in the data storing area 34 of the RAM 13, it is determined in S180 whether or not the macro assigned for the next document set is different from the current macro. If so (S180:YES), then a pointer indicating the current macro is updated. Then, in S200, a print sub-routine is executed for printing out the subsequent document set. Detailed description of the print sub-routine will be provided later. After in S200, the counter value of the document counter is incremented by one in S210, and the program returns to S170.

It should be noted that, in S30, the job control command, that is, the above-described print setting data in this case, can be stored in the data storing area 34 of the RAM 13 without being changed in its format. In this case, no table is formed. Then, it can be determined in S180 whether or not a current macro should be updated based on the data stored in the second and the third areas 51, 52 of the print setting data before printing of a subsequent document set is started. Then, if the current macro needs to be updated (S180:YES), the CPU 12 updates the current macro. This determination process can be executed by providing an additional switch counter for indicating a first one of identical copy sets. Then, it is determined whether or not the value of the document counter is equal to a value of the switch counter. If so, the current macro is updated.

Figure 6:
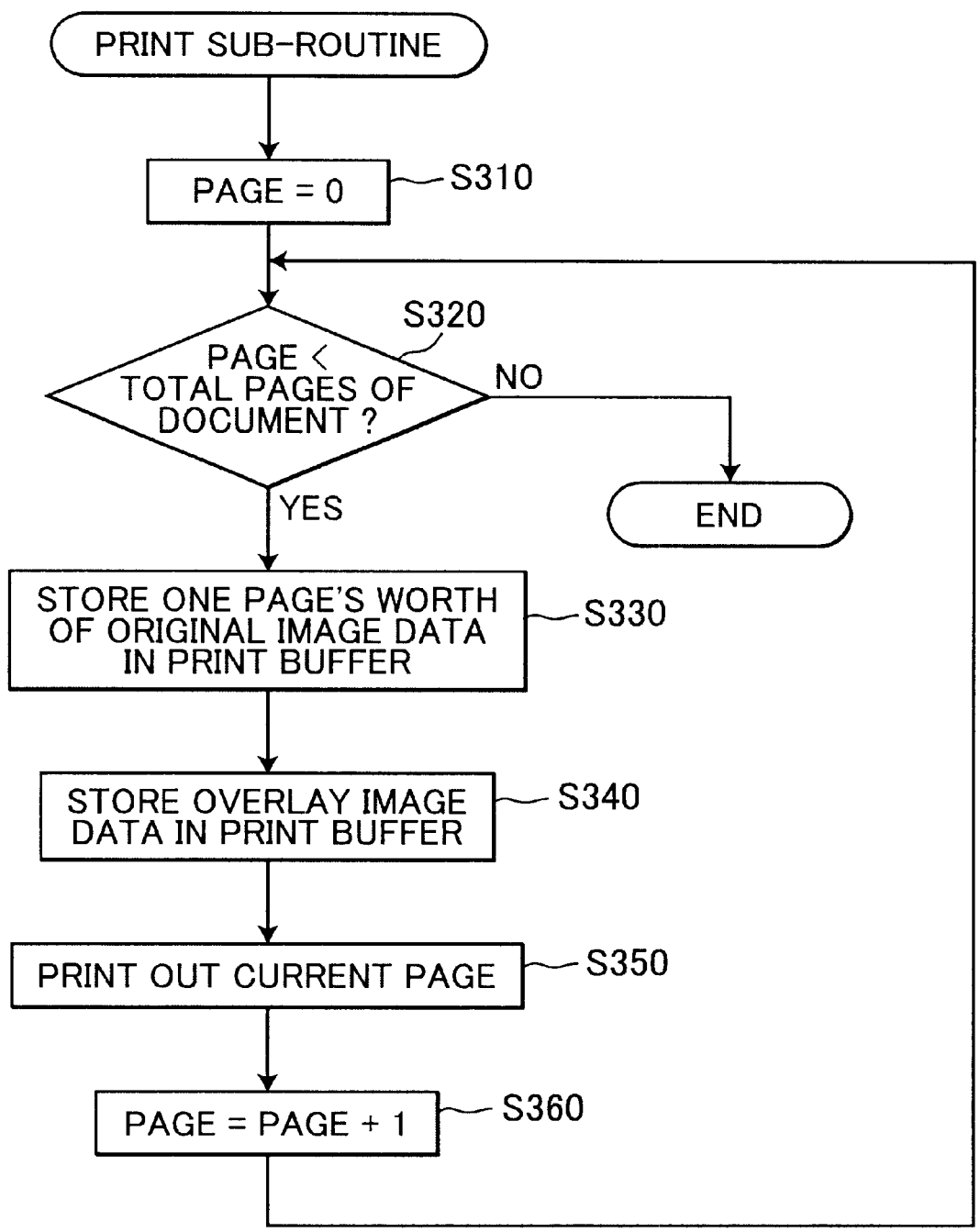
FIG. 6 is a flowchart representing a subroutine of the print routine.

Next, the print sub-routine executed in S200 will be described while referring to the flowchart shown in FIG. 6. First, in S310, a counter value of the page counter is initialized to zero. Then, it is determined in S320 whether or not the counter value of the page counter is less than the total number of pages in the document. If so (S320:YES), in S330, one page's worth of the original image data stored in the image buffer 32 is stored in the print buffer 33. Next, in S340, form-overlay data registered as the current macro is retrieved from the image buffer 32 and stored in the print buffer 33. Then, the form-overlay data is combined with the original image data in the print buffer 33. The resultant image data is, in S350, retrieved from the print buffer 33 and an image is printed out accordingly. Then, the program returns to S320. It should be noted that if a plurality of macros are designated for the current document set, the process in S340 is repeated for executing all of the macros.

The above-described processes are repeated until all pages of the current document set are printed out (S320:NO), then, the program is ended.

As described above, according to the present invention, a user can designate a different macro or a combination of macros for each of a plurality of document sets using a simple method.

Also, in the above-mentioned embodiment, the macro storage unit 19 for storing macros is provided in the printer 10. Therefore, the computer 20 needs to transmit only small amounts of data to the printer 10. This shortens communication time between the printer 10 and the computer 20.

Also, the original image data and the overlay image data stored in the image buffer 32 are combined in the print buffer 33 without being erased from the image buffer 32. Because the original image data is stored in the image buffer 32, when a subsequent document set is to be printed out, it is unnecessary to repeat the process for generating original image data from the original print data. Therefore, the printer 10 will spend less time processing data.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiment, when the user wishes to designate a different macro for each one of document sets, the user inputs document set numbers "1", "2", "3", "4" in this order from the uppermost second input of desired macros in corresponding first input boxes 27. However, the macro setting region can be modified to enable a user to set a different macro for each single document set in a simple method.

For example, a macro setting region can be designed to show a listing for each document set of a document series to be printed so that there is no need to input document set numbers. The macro setting region will include only one input box to which the user needs to input numerals indicating identification numbers of desired macro. If, for example, the user wishes not to designate any macro for first and second document sets, the user leaves the corresponding second input boxes blank. Then, if the user wishes to designate the same macro for the third to fifth document sets, then the user inputs an identification number of a desired macro in the second input box corresponding to the third copy and leaves blank the second input boxes corresponding to the fourth and fifth document sets. Then, if the user wishes to designated a macro different from the macro designated for the third to fifth document sets, then the user can input an identification number of the different macro in the corresponding second input box. This should be understood as merely an illustrative example of setting macro. Macro can be set using any other method.

In the above-described embodiment, macros of form-overlay data for forming overlay images are described. However, a macro of command data for executing various commands also can be registered and executed in the print system 1. The command data can be, for example, data for executing enlargement printing, for executing reduced printing, for designating a different discharge tray, or for one-side or two-side printing.

Also, in the above-described embodiment, the printer 10 is provided with the macro storage unit 19 for storing macros. When the user generates the new macro using the printer driver of the computer 20, a new macro is transmitted and stored in the macro storage unit 19 of the printer 10. However, an additional macro storage unit can be provided in the computer 20. In this case, the above-described processes in S10 to S360 except the process in S350 can be executed in the computer 20 rather than in the printer 10. Then, the computer 20 transmits image data to the printer 10 so that the printer 10 can execute printing operations without further processing the image data.

Further, in the above-described embodiment, the original image data and the overlay image data temporarily stored in the image buffer 32 are stored in the print buffer 33 and combined in S340. However, the overlay image data can be combined with the original image data in the image buffer 32 as soon as the overlay image data is generated from the form-overlay data. In this case, the print buffer 33 is unnecessary.

If the printer 10 is a color printer for forming a multicolor image, a macro for designating monochromatic printing can be registered. Specifically, if the printer 10 is an ink jet color printer, the printer 10 includes a plurality of print heads each for ejecting ink in a different color, that is, red color (R) ink, green color (G) ink, blue color (B) ink, and black color (K) ink. The printer 10 executes color printing based on color print data stored in the image buffer 32. The color print includes values for different colors, that is, R, G, and B, of each dot. The color print data may be formed in PDL.

According to the present invention, in order to execute monochromatic printing using only black color (K) based on the color print data, a macro for executing the following processes can be stored. First, the color print data is converted into monochromatic print data. Specifically, the values of different colors R, G, B of each dot are multiplied by predetermined coefficients and then added up. The coefficients may be set such that a sum of the coefficients becomes approximately 1. For example, the coefficients for the values of R, G, and B can be 0.6, 0.3, and 0.1, respectively. That is, the value of K can be obtained by the following formula:

$$0.6R+0.3G+0.1B=K$$

Then, based on thus obtained monochromatic print data, the printer 10 executes printing operations using only black color ink. As a result, a monochromatic image can be obtained.

In order to obtain the black color value from the values of R, G, and B, it is preferable to use a table which is specifically designed for converting color print data to monochromatic print data. The table can be pre-stored in the printer 10. Alternatively, a macro can includes data on the table, and the data can be transmitted from the computer 20 to the printer 10 when the macro is executed.

When color printing is not necessary for a particular document set, the printer 10 can execute monochromatic printing instead. For example, when the user needs to obtain a document set for himself/herself and a document set for a client, the user can obtain a monochromatic document set of himself/herself and a color document set for the client. Because the monochromatic printing is less expensive than the color printing, running costs of the printer 10 can be reduced.

What is claimed is:

1. A print system that produces plural copies of a document set, comprising:

an original data generating unit that generates a single set of original data, each of the plural copies of the document set including the single set of the original data, the plural copies of the document set being divided into plural groups;

a memory that stores a plurality of macros;

macro designating means for enabling a user to selectively designate at least one macro to each of the plural groups such that the following macro designations may be made by the user: 1. designating the same macro to all of the groups, 2. designating a different macro to each group, and 3. designating one macro to some groups and designating another macro to other groups, each of the plural groups respectively comprising at least one copy of the document set including the single set of original data and the at least one designated macro;

copy number setting means for enabling the user to set a number of copies of the document set for the each of the plural groups, respectively; and an image forming unit that produces the number of copies of the document set in the each of the plural groups, respectively.

2. The print system according to claim 1, further comprising:

a macro generating unit that generates a macro, wherein the memory stores the plurality of macros generated by the macro generating unit; and a print data generating unit that generates print data based on the single set of original data and the at least one designated macro for each of the plural groups, wherein the image forming unit produces the number of copies of the document set in the each of the plural groups based on the print data.

3. The print system according to claim 1, wherein the memory stores the plurality of macros, the plurality of macros including any ones of overlay macros and command macros.

4. A print system the produces plural copies of a document set, comprising:

a computer; and an image forming device communicable with the computer, wherein:

the computer includes:
a macro generating unit that generates at least one macro;
an original print data generating unit that generates a single set of original data, each of the plural copies of the document set including the single set of the original data, the plural copies of the document set being divided into plural groups;
macro designating means for enabling a user to selectively designate at least one macro to each of the plural groups such that the following macro designations may be made by the user: 1. designating the same macro to all of the groups, 2. designating a different macro to each group, and 3. designating one macro to some groups and designating another macro to other groups, each of the plural groups respectively comprising at least one copy of the document set including the single set of original data and at least one designated macro;
copy number setting means for enabling the user to set a number of copies of the document set for the each of the plural groups, respectively; and
a communication unit that communicates the image forming device; and the image forming device includes:
a first memory that stores the at least one macro transmitted from the communication unit;
a second memory that stores the single set of original print data transmitted by the communication unit; and
an image forming unit that produces the number of copies of the document set in each of the plural groups, respectively.

5. The print system according to claim 4, wherein the image forming unit produces the number of copies of the document set in each of the plural groups, respectively, based on the single set of original data and the at least one designated macro.

6. The print system according to claim 4, wherein the macro is a form-overlay macro, and the image forming unit executes form-overlay printing for forming an overlay image based on the at least one designated form-overlay macro for producing the number of copies of the document set in the each of the plural groups, respectively.

7. The print system according to claim 6, wherein the image forming device further includes image data generating means for generating overlay image data based on the at least one designated form-overlay macro for each of the plural groups and for generating original image data based on the single set of original data, an image buffer that stores the overlay image data for each of the plural groups and the original image data, and a print buffer that stores the overlay image data and the original image data, and the overlay image data stored in the print buffer is combined with the original image data for generating print data for each of the plural groups.

8. The print system accordingly to claim 4, wherein the macro is a monochromatic macro, the original data is original color data, the image forming unit executes multicolor printing for forming a multicolor image based on the original color data, wherein the image forming unit executes monochromatic printing operations for forming a monochromatic image based on the original color data and based further on the at least one designated monochromatic macro so as to produce the number of copies of the document set in the each of the plural groups, respectively.

9. An image forming device that is communicable with an external device and produces plural copies of a document set, each of the plural copies of the document set including a single set of the original data, the plural copies of the document set being divided into plural groups, comprising:

macro generating means for generating a macro;

a memory that stores at least one macro generated by the macro generating means;

macro designating means for enabling a user to selectively designate at least one macro to each of the plural groups such that the following macro designations may be made by the user: 1. designating the same macro to all of the groups, 2. designating a different macro to each group, and 3. designating one macro to some groups and designating another macro to other groups, each of the plural groups respectively comprising at least one copy of the document set including the single set of print data and the at least one designated macro; and an image forming unit that executes printing operations to produce the number of copies of the document set in the each of the plural groups, respectively, based on the single set of original data received from the external device and based further on the at least one designated macro.

10. The image forming device according to claim 9, wherein the macro is a form-overlay macro.

11. The image forming device according to claim 10, further comprising image data generating means for generating overlay image data for each of the plural groups based on the at least one designated form-overlay macro and for generating original image data based on the single set of original data, an image buffer that stores the overlay image data for each of the plural groups and the original image data, and a print data buffer that stores the overlay image data and the original image data, wherein the overlay image data stored in the print data buffer is combined with the original image data for generating print data for each of the plural groups, respectively.

12. The image forming device according to claim 9, the macro is a monochromatic macro, the original data is original color data, and the image forming unit executes multicolor printing operations for forming a multicolor image based on the original color data received from the external device, wherein the image forming unit executes monochromatic printing operations for forming a monochromatic image based on the original color data and based further on the at least one designated monochromatic macro for producing the number of copies of the document set in the each of the plural groups, respectively.

13. A method of producing plural copies of a document set, the method comprising the steps of:
 a) generating a macro;
 b) transmitting the macro from a computer to an image forming device;
 c) storing the macro transmitted from the computer into a memory of the image forming device;
 d) generating a single set of original data, each of the plural copies of the document set including the single set of the original data, the plural copies of the document set being divided into plural groups;
 e) enabling a user to selectively designate at least one macro to each of the plural groups such that the following macro designations may be made by the user: 1. designating the same macro to all of the groups, 2. designating a different macro to each group, and 3. designating one macro to some groups and designating another macro to other groups, each of the plural groups respectively including at least one copy of the document set including the single set of original data and the at least one designated macro;
 f) enabling the user to set a number of copies of the document set for the each of the plural groups, respectively; and
 g) producing the number of copies of the document set in the each of the plural groups, respectively.

14. The method according to claim 13, wherein the macro generated in the step of a) is a form-overlay macro.

15. The method according to claim 13, further comprising the steps of h) generating original image data based on the single set of original data, i) generating overlay image data based on the at least one designated form-overlay macro for each of the plural groups, j) storing the original image data in a print buffer, and k) storing the overlay image data in the print buffer to combine the overlay image data with the original image data so as to produce print data for each of the plural groups, respectively.

* * * * *